United States Patent
Hoo et al.

(10) Patent No.: US 7,558,554 B2
(45) Date of Patent: Jul. 7, 2009

(54) METHOD AND SYSTEM FOR ANTENNA SELECTION DIVERSITY WITH PREDICTION

(75) Inventors: Min Chuin Hoo, Sunnyvale, CA (US); Rajendra Tushar Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 440 days.

(21) Appl. No.: 10/810,433

(22) Filed: Mar. 26, 2004

(65) Prior Publication Data

US 2005/0186921 A1 Aug. 25, 2005

Related U.S. Application Data

(60) Provisional application No. 60/547,362, filed on Feb. 24, 2004.

(51) Int. Cl.
*H04B 1/06* (2006.01)

(52) U.S. Cl. ............... 455/277.1; 375/267; 375/347; 375/349; 343/876

(58) Field of Classification Search ............... 455/121, 455/273, 275, 276.1, 277.1, 277.2, 278.1, 455/280, 306, 272, 226.1, 67.11, 161.2, 101, 455/115.2, 115.3, 115.1, 115.4, 506, 63.1, 455/63.4, 19, 561, 456.5, 456.6, 424, 425, 455/550.1, 575.1, 412.1, 418–420, 186.1, 455/557, 575.7; 343/713, 767, 702, 814, 343/815, 860, 833, 834, 876, 893, 795, 770, 343/853, 816, 895, 720, 904; 342/373, 372, 342/374, 368, 417, 427, 433–435; 375/295, 375/130, 242, 144, 349, 347, 267, 343, 334, 375/132, 146, 224, 148

See application file for complete search history.

(56) References Cited

U.S. PATENT DOCUMENTS

| | | | | |
|---|---|---|---|---|
| 4,704,734 A | * | 11/1987 | Menich et al. | 455/440 |
| 5,530,926 A | * | 6/1996 | Rozanski | 455/277.2 |
| 5,548,836 A | * | 8/1996 | Taromaru | 455/277.1 |
| 5,634,204 A | * | 5/1997 | Takahashi et al. | 455/134 |
| 6,067,449 A | * | 5/2000 | Jager | 455/277.2 |
| 6,118,773 A | * | 9/2000 | Todd | 370/334 |
| 6,327,481 B1 | * | 12/2001 | Nagashima | 455/562.1 |

(Continued)

FOREIGN PATENT DOCUMENTS

JP 2004007145 * 1/2004

*Primary Examiner*—Duc Nguyen
*Assistant Examiner*—Charles Chow
(74) *Attorney, Agent, or Firm*—McAndrews, Held & Malloy

(57) ABSTRACT

Certain embodiments of the invention may be found in a method and system for antenna selection diversity with prediction. An antenna diversity system may use information that it has stored on the antenna selection process in previous frames to predict the starting receiving antenna and the starting transmission antenna for the next frame. The prediction may be based on which antennas were selected in previous frames or may be based metrics associated with performance of the antennas. Prediction may be based on a majority polling scheme of previously selected antennas in a determined number of previous frames. Prediction may also be based on a weighted sum of at least one selection metric for all antennas in a determined number of previous frames. Antenna prediction provides a significant performance improvement by reducing the processing and operational overhead in cases where a transmit or a receive antenna dominates.

33 Claims, 5 Drawing Sheets

U.S. PATENT DOCUMENTS

| | | | |
|---|---|---|---|
| 6,415,141 B1 * | 7/2002 | Kakura et al. | 455/277.1 |
| 6,456,647 B1 * | 9/2002 | Banister | 375/142 |
| 6,553,078 B1 * | 4/2003 | Åkerberg | 375/267 |
| 6,690,665 B1 * | 2/2004 | Choi et al. | 370/376 |
| 6,731,905 B2 * | 5/2004 | Ogino et al. | 455/11.1 |
| 6,839,550 B2 * | 1/2005 | Iguchi et al. | 455/277.1 |
| 6,891,901 B2 * | 5/2005 | Heise | 375/296 |
| 6,907,094 B2 * | 6/2005 | Matsui et al. | 375/347 |
| 6,983,172 B2 * | 1/2006 | Harrison | 455/561 |
| 7,039,356 B2 * | 5/2006 | Nguyen | 455/13.3 |
| 7,221,923 B2 * | 5/2007 | Jimi et al. | 455/277.1 |
| 2004/0203500 A1 * | 10/2004 | Wong et al. | 455/90.3 |
| 2005/0009492 A1 * | 1/2005 | Mueller et al. | 455/303 |
| 2005/0095987 A1 * | 5/2005 | Lyons et al. | 455/67.13 |
| 2005/0113038 A1 * | 5/2005 | Kasami et al. | 455/101 |
| 2005/0123083 A1 * | 6/2005 | Kawakami | 375/347 |
| 2006/0234776 A1 * | 10/2006 | Ishihara et al. | 455/562.1 |

\* cited by examiner

| Frame number (n) | Scheme to chose starting antenna |
|---|---|
| 1 | Arbitrary |
| 2 | 1 - out of - 1 (same as choosing the best receive antenna of the previous frame as the starting antenna) |
| 3 | 1 - out of -1 |
| 4 | 2 - out of - 3 |
| 5 | 2 - out of - 3 |
| 6 | 3 - out of - 5 |
| 7 | 3 - out of - 5 |
| 8 and onwards | 4 - out of - 7 |

FIG. 3

METHOD AND SYSTEM FOR ANTENNA SELECTION DIVERSITY WITH PREDICTION

CROSS-REFERENCE TO RELATED APPLICATIONS/INCORPORATION BY REFERENCE

This application makes reference to, claims priority to, and claims the benefit of U.S. Provisional Application Ser. No. 60/547,362, filed Feb. 24, 2004.

This application makes reference to:
U.S. Utility application Ser. No. 10/810,462, filed Mar. 26, 2004;
U.S. Utility application Ser. No. 10/810,186, filed Mar. 26, 2004; and
U.S. Utility application Ser. No. 10/810,408, filed Mar. 26, 2004.

The above stated applications are hereby incorporated herein by reference in their entirety.

FIELD OF THE INVENTION

Certain embodiments of the invention relate to wireless communication. More specifically, certain embodiments of the invention relate to a method and system for antenna selection diversity with prediction.

BACKGROUND OF THE INVENTION

In a wireless communication system, a data stream will most likely experience multiple reflections (multipath) while propagating between the transmitter and the receiver. Multipath fading implies that multiple copies of the transmitted signal follow different paths and reach the receiving antenna with different time delays. In such cases the received signal strength at a given time is the result of destructive and constructive interference of the multiple paths arriving from different directions. Destructive interference degrades the performance of the detector and hence adversely affects the system capacity. However, by using multiple antennas at the receiver and with appropriate digital signal processing methods, multipath can be exploited to enhance the performance and robustness of the receiver and to increase the reliability of the communications link. The receiving antennas generally must be spaced sufficiently far apart that the signal each antenna sees is not correlated with the signals seen by the other antennas. One such method of mitigating multipath fading is called selection diversity.

Selection diversity is based on selecting the best signal among plurality of signals detected at the receiver antennas. Let $P_i$ denote the power estimated at antenna i at the receiver. Then, the selection diversity scheme will select antenna j as the receive antenna if $P_j > P_i$, i≠j. Higher accuracy in estimating the powers $P_i$ results in higher probability of the right receive antenna being selected and better performance of the selection diversity scheme. Two main factors that affect the accuracy of the power estimates $P_i$ may include a dwell time on all antennas other than the starting antenna and presence of impairments such as noise, transients and offsets.

With regard to dwell time on all antennas other than the starting antenna, in practical wireless communications systems, time constraints are imposed to keep the transmission overhead low. As a result, the dwell time on all antennas other than the starting antenna is insufficient to allow for automatic gain control (AGC) to run its full course during the dwell time on each antenna. Without automatic gain control, the visibility of the signal strength of all antennas other than the starting antenna is limited and generally leads to inaccurate power estimates $P_i$.

With regard to the presence of impairments such as noise, transients and offsets, impairments corrupt the power estimates $P_i$ and may result in mis-estimations of the received power. Such mis-estimations of power may result in the selection of antenna j as the receive antenna even if $P_j < P_i$ for some other antenna i. Because dwell time on all antennas other than the starting antenna is limited, a predetermined gain may be generally applied to all antennas other than the starting antenna. When the signal in antenna j, where antenna j is not the starting antenna, is very strong, the predetermined gain applied to antenna j may be too high for that signal and the signal may be clipped. If the clipped signal in antenna j was in fact the best received signal available to the receiver, the receiver may end up selecting a signal from antenna i, where $P_i < P_j$, because it may not be able to estimate accurately the power of a signal when it is clipped.

In general, the power estimate of the starting antenna is generally more reliable than those of the other antennas because carrier detection and full AGC are performed on the starting antenna. This leaves insufficient time for running a full AGC on the other antennas. Although there are ways to improve the accuracy of the power estimates of antennas other than the starting antenna, the selection diversity scheme will perform considerably better and more effectively if the starting antenna happens to be the antenna with the highest signal power.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for antenna selection diversity with prediction. Selection diversity in systems with multiple antennas works best when the set of starting antennas may be the best antennas for signal detection and signal decoding. Certain aspects of the method for antenna selection diversity with prediction may comprise collecting information that may be associated with at least one of the previous received frames and determining at least one starting receiving antenna for the next frame based on the collected information. The collected information may correspond to the performance of at least one of the antennas in the receiver system. The collected information may be one of several selection metrics that measure the performance of the antennas during a frame. The selection metrics may be, for example, a power estimation, a signal-to-noise ratio, a packet error rate or bit error rate, a propagation channel characteristic, and/or a channel interference level. Selection of the starting receiving antenna may be based on at least one of these selection metrics. The number of collected frames that may be utilized for antenna prediction may be predetermined or may be updated after each new starting antenna is selected.

Antenna prediction may be based on collected information regarding or pertaining to which antennas may have been selected in previous frames as the best antenna for signal detection and decoding. A majority polling scheme may be used to predict the next starting antenna by selecting at least one antenna that has been previously the best antenna for signal detection and signal decoding in a specified number of frames. A threshold regarding or pertaining to what constitutes majority in majority polling may be predetermined or may be varied based on the number of previous frames under consideration. The threshold for what constitutes majority in majority polling may be updated if the number of antennas in a determined number of frames does not meet the specified threshold.

Antenna prediction may be based on collected information regarding or pertaining which antennas may have had a better overall performance in at least one selection metric over a predetermined number of frames. Determining the best overall performance may be based on a weighted sum scheme of at least a portion of the stored information. The weighted sum scheme may correspond to a filtering approach, where the overall performance of an antenna may be based on an estimated selection metric or on an received selection metric in the antenna over a predetermined number of frames. The response of the weighted sum scheme may also correspond to the response of a first-order infinite impulse response (IIR) filter or to that of a finite impulse response (FIR) filter depending on the constraints.

Antenna selection diversity with prediction may also comprise selecting at least one starting transmit antenna from a set of transmitter antennas. Selection may be based on selection metrics, for example, a power estimation, a signal-to-noise ratio, a packet error rate or bit error rate, a propagation channel characteristic, and/or a channel interference level. Transmission antenna prediction may provide efficiency and speed improvements by reducing transmission processing overhead and by improving signal detection which in turn improves receiving antenna prediction.

Another embodiment of the invention may provide a machine-readable storage, having stored thereon, a computer program having at least one code section executable by a machine, thereby causing the machine to perform the steps as described above for antenna selection diversity with prediction.

Aspects of the system for antenna selection diversity with prediction may comprise a processor that collects information that may be associated with at least one of the previous transmission frames and that determines at least one starting receive antenna for the next frame based on the collected information. The collected information may be stored in memory and may correspond to the performance of at least one of the antennas in the receiver system. The collected information may be one of several selection metrics that measure the performance of the antennas during a frame. The selection metrics may be, for example, a power estimation, a signal-to-noise ratio, a packet error rate or bit error rate, a propagation channel characteristic, and/or a channel interference. The processor may select the starting receiving antenna based on at least one of these selection metrics. The processor may determine the number of collected frames that may be utilized for antenna prediction or may update the number after each new starting antenna is selected.

The processor may base antenna prediction on collected information of which set of antennas may have been selected in previous frames as the best set of antennas for signal detection and decoding. The processor may use a majority polling scheme to predict the next starting antenna by selecting at least one antenna that has been the best antenna for signal detection and signal decoding in a specified number of frames. A threshold may be predetermined regarding or pertaining to what constitutes majority in majority polling or it may vary the threshold based on the number of previous frames under consideration. The threshold for what constitutes majority in majority polling if the number of antennas in a determined number of frames does not meet the specified threshold.

Antenna prediction may be based on collected information of which antennas may have had a better overall performance in at least one selection metric over a predetermined number of frames. The best overall performance may be determined by the processor based on a weighted sum scheme of at least a portion of the stored information. The processor may select a filtering approach that corresponds to a weighted sum scheme, where the overall performance of an antenna may be based on an estimated selection metric and/or a received selection metric over a predetermined number of frames. The response of the weighted sum scheme may correspond to the response of a first-order infinite impulse response (IIR) filter or to that of a finite impulse response (FIR) filter depending on the constraints.

The processor may also select at least one starting transmit antenna from a a set of transmitter antennas. Selection may be based on selection metrics, for example, a power estimation, a signal-to-noise ratio, a packet error rate or bit error rate, a propagation channel characteristic, and/or a channel interference. Transmission antenna prediction may provide efficiency and speed improvements by reducing transmission processing overhead and by improving signal detection which in turn improves receiving antenna prediction.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 illustrates an example of threshold levels that may be used by a receiver system to arbitrarily or adaptively predict the next starting antenna, in accordance with an embodiment of the invention.

DETAILED DESCRIPTION OF THE INVENTION

Certain embodiments of the invention may be found in a method and system for antenna selection diversity with prediction. Wireless communication systems may utilize receivers with multiple antennas to enhance the performance and robustness of the receiver and to increase the reliability of the communications link. Selection diversity in systems with multiple antennas works best when the set of starting antennas may be the best antennas for signal detection and signal decoding. Certain aspects of the method for antenna selection diversity with prediction may comprise collecting information that may be associated with at least one of the previous received frames and determining at least one starting receiving antenna for the next frame based on the collected information. The collected information may correspond to the performance of at least one of the antennas in the receiver system. The collected information may be one of several selection metrics that measure the performance of the antennas during a frame. The selection metrics may be, for example, a power estimation, a signal-to-noise ratio, a packet error rate or bit error rate, a propagation channel characteristic, and/or a channel interference level. Selection of the starting receiving antenna may be based on at least one of these selection metrics. The number of collected frames that may be utilized for antenna prediction may be predetermined or may be updated after each new starting antenna is selected.

Figure 1A:
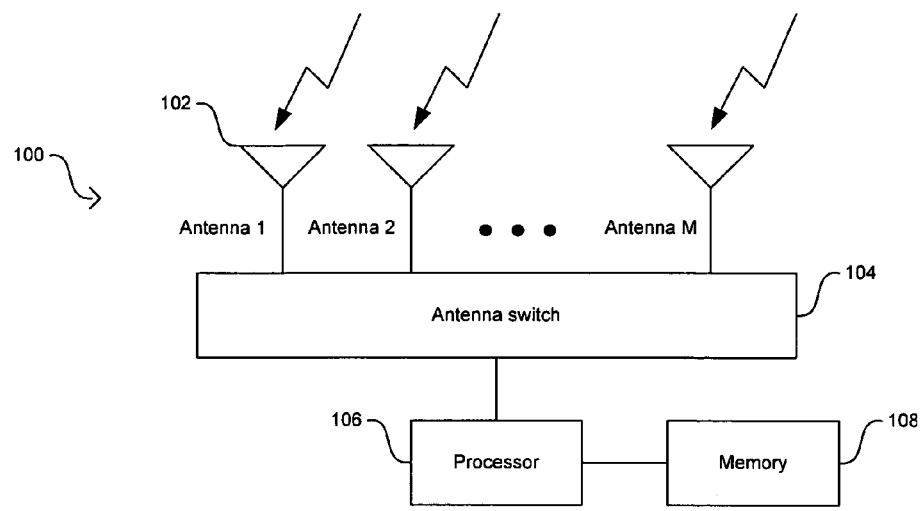
FIG. 1A is a diagram of an exemplary receiver system that may be utilized in connection with selection diversity with prediction, in accordance with an embodiment of the invention.

FIG. 1 is a diagram of an exemplary receiver system that may be utilized in connection with selection diversity with prediction, in accordance with an embodiment of the invention. Referring to FIG. 1, the receiver system 100 may comprise at least one antenna 102, an antenna switch 104, a processor 106, and a memory 108. There may be as many as M antennas 102 coupled to the antenna switch 104. The antenna 102 may be part of an independent antenna array of antennas coupled to the antenna switch 104, may be one of several individual antennas coupled to the antenna switch 104, and/or may be one of several integrated individual antennas and/or may be part of an integrated array of antennas coupled to the antenna switch 104. The antenna switch 104 may be a mechanical, electronic, electromechanical, and/or micro-electromechanical (MEM) switch. The processor 102 may be, for example, a hardware resource, a core processor, a coprocessor, a digital signal processor, or a microcontroller. The memory 108 may be an external memory, an embedded memory, a shared memory, or a main memory. The memory 108 may be, for example, an SRAM and/or DRAM type memory.

The incoming wireless signal may be received by at least one antenna 102 in receiver system 100. The antenna switch 104 may select the antenna channel of any antenna 102. The processor 106 may notify the antenna switch 104 regarding which antenna channel corresponding to a particular antenna 102 to select. The processor 106 may be utilized to determine which antenna 102 may be the starting antenna, to determine which antenna 102 to select next, to determine the dwell time in each selected antenna, to detect and decode the incoming signal, and to amplify or apply a gain to the signal. The processor 106 may be adapted to apply gain to the signal from an antenna channel by utilizing an automatic gain control (AGC) or by determining a specific gain to apply. The processor 106 may be used to determine the estimated power of the signal, to determine a signal-to-noise ratio, to determine a packet-error-rate or bit-error-rate, to transfer information to and from memory 108, and to determine statistics based on information collected from several transmitted frames stored in memory 108. The memory 108 may be utilized to store information collected and processed by the processor 106 that may be associated with any antenna 102 in any number of transmitted frames.

In operation, the processor 106 may notify the antenna switch 104 which antenna 102 may be used as the starting antenna. The processor 106 may determine which antenna 102 to use for the starting antenna based on information from preceding frames that may be stored in memory 108. The antenna switch 104 may select the antenna channel that corresponds to the selected antenna 102. The processor 106 may dwell on the starting antenna until it detects an incoming signal. Once the signal is detected, an AGC may be applied to obtain a sufficiently strong signal for decoding. The processor 106 may determine the estimated received power for the starting antenna and may store the value in memory 108. The processor 106 may then notify the antenna switch 104 to select the next antenna 102 for detection. The processor 106 may determine which antenna 102 to use as the next antenna based on information from preceding frames that may be stored in memory 108. The antenna switch 104 may select the antenna channel that corresponds to the next antenna. The processor 106 may dwell on the next antenna and apply a predetermined gain because the dwell time may be insufficient for an AGC to run its full operation. The processor 106 may determine the estimated received power for the next antenna and may store the value in memory 108. A similar procedure may be carried out with the remaining antennas in receiver system 100. With the exception of the starting antenna, a predetermined gain may be applied to all the other antennas because dwell time in all but the starting antenna may be limited. The processor 106 may determine an estimated received power for all antennas in receiver system 100 and store the values in memory 108. The processor 106 may select the best antenna for decoding by selecting the highest estimated received power to determine which of the antenna 102 which has the strongest signal. The processor 106 may then notify the antenna switch 104 to select the antenna channel that corresponds to the antenna with the strongest signal for decoding. The processor 106 may then detect and decode the signal from the selected best antenna and may store information associated with the antenna it selected as the best antenna for the current frame.

Figure 1B:
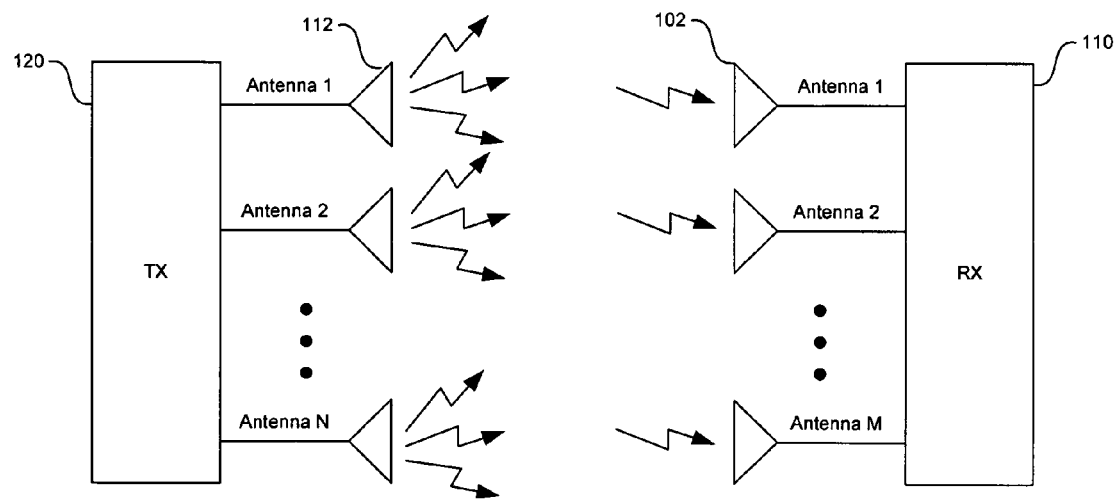
FIG. 1B is a diagram of an exemplary transmitter system and receiver system that may be utilized in connection with selection diversity with prediction, in accordance with an embodiment of the invention.

FIG. 1B is a diagram of an exemplary transmitter system and receiver system that may be utilized in connection with selection diversity with prediction, in accordance with an embodiment of the invention. Referring to FIG. 1B, a general transmission (TX) system 120 and a general receiver (RX) system 110 may be used for communicating between two locations. The TX system 120 may have as many as N TX antennas 112 coupled to it and the RX system 110 may have as many of M antennas 102 coupled to it. The TX antennas 112 may be part of an independent antenna array of antennas, may be one of several individual antennas, and/or may be one of several integrated individual antennas and/or may be part of an integrated array of antennas. The TX antennas 112 may be broadcasting antennas or may be directional antennas.

In operation, the TX system 120 may select one of the TX antennas 112 to send the first frame of information. The TX antenna 112 selected for the first frame may then transmit the frame for the RX system 110 to receive. The RX system 110 may select the best antenna 102 for receiving the first frame from the TX system 120. The TX system 120 may select a new TX antenna 112 to send the second frame of information. The RX system 110 may detect the second frame by selecting a different best antenna 102 than it did for the first frame. After several frames of information are sent and received, the RX system 110 may have collected sufficient information to determine that when a frame of information is sent from a particular TX antenna 112, the RX system 110 receives the best metric from at least one of the selection metrics. The RX system 110 may also determine when a frame is sent from a particular TX antenna 112, the selection diversity may take less time to carry out because the best selection metric is concentrated among a group of antennas 102. In these instances, the RX system 110 may provide the TX system with this frame so that the TX system 120 may select only the TX antennas 112 that provide the best selection metric or provide the most rapid and efficient detection in RX system 110. This also has the effect of increasing the speed of transmission since the TX system 120 may not need to spend the processing overhead to determine the next antenna for transmission and the RX system 110 may be able to predict the best antenna for signal detection.

Figure 2:
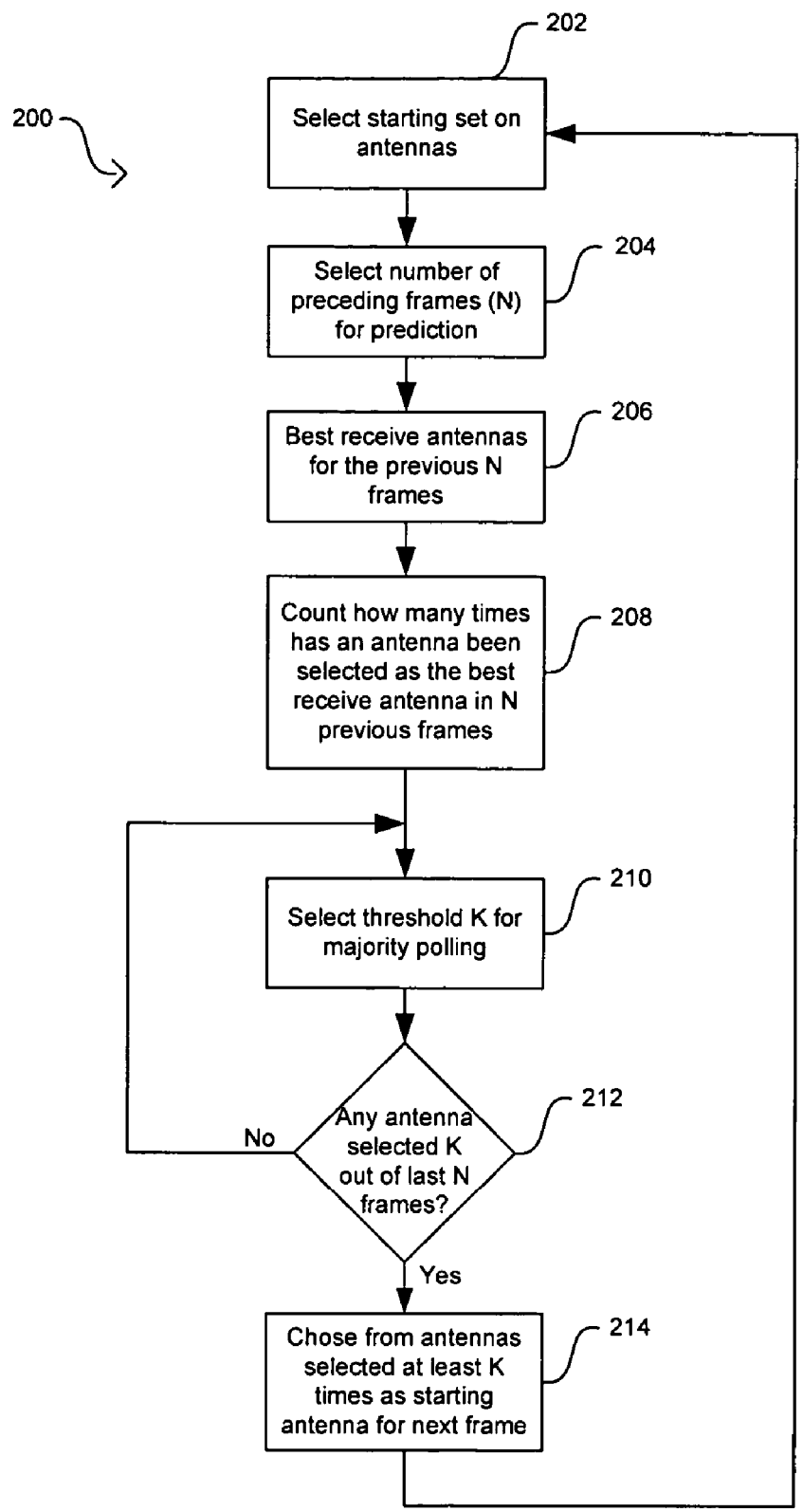
FIG. 2 is a flow diagram that illustrates exemplary steps that may be used by a receiver system to predict the next starting antenna based on a majority polling scheme, in accordance with an embodiment of the invention.

FIG. 2 is a flow diagram that illustrates exemplary steps that may be used by a receiver system to predict the next starting antenna based on a majority polling scheme, in accordance with an embodiment of the invention. Referring to FIG. 2, the flow chart 200 starts by selecting a set of at least one starting antenna in step 202. If more than one receive path is available then the processor 106 may select more than one starting antenna in step 202. In step 204, the processor 106 may select the number N of preceding frames to utilize for determining the next starting antenna. The information on the preceding frames may have been collected by processor 106 and stored in memory 108. In step 206, the processor 106 may transfer from memory 108 information associated with the antennas which may have been chosen as the best antenna for signal detection and signal decoding over the N previous frames. The selection of best antenna for signal detection and signal decoding may be based on the antenna with the highest estimated received power in a particular frame. In step 208, the processor 106 may count the number of times in the previous N frames that an antenna may have been selected as the best antenna. In step 210, the processor 106 may determine the threshold level K that may be needed to select an antenna as the starting antenna for the next frame. The threshold level K may be predetermined based on the number N of frames that may be utilized in determining the next starting antenna. The threshold level K may be dynamically updated based on collected information.

In step 212, the processor 106 may determine whether any of the antennas selected as best antenna over the previous N frames meets or exceeds the threshold level K. If one antenna meets or exceeds the threshold level K, then the processor 106 may proceed to step 214. If more than one antenna meets or exceeds the threshold level K, then the processor 106 may return to step 210 and update the threshold level K to provide a majority result. If no antenna meets or exceeds the threshold level K, then the processor 106 may return to step 210 and update the threshold level K to provide a majority result. If at least one antenna meets or exceeds the threshold in step 212, then the processor may proceed to step 214. In step 214, the processor 106 may select as the next starting antenna one of the antennas which may have either met or exceeded the threshold level in step 212. The processor 106 may select several of the antennas which may have either met or exceeded the threshold level in step 212 and use a selection metric to determine which one to use. The selection metric may be, for example, an estimated received power, a received power, a signal-to-noise ratio, a bit error rate, a packet error rate, a propagation channel characteristic, an/or a channel interference.

For example, a receiver system 100 may have antenna prediction based on a majority polling scheme and may select antenna j as the starting antenna of the next frame if antenna j is chosen as the best receive antenna K times in the N previous frames. This may be denoted as K-out-of-N starting antenna selection scheme. For example, if N is odd and $K=(N+1)/2$, then the K-out-of-N starting antenna selection scheme is that of an absolute majority polling. The number of N previous frames may be even or odd. The choices of N and K may be predetermined or they may be updated by the processor 106 based on the number of frames N and the count of selected antennas in step 208.

The greater the value of parameter N, the greater the number of previous frames used and the less likely that the chosen starting antenna will change from frame to frame. However, the greater the value of parameter N, the longer it will take to activate the selection scheme. A K-out-of-N starting antenna selection scheme generally comes into effect on frame N+1 even though it may start as early as frame K+1. Before the K-out-of-N starting antenna selection scheme kicks in, the starting antenna may be chosen arbitrarily or adaptively.

FIG. 3 illustrates an example of threshold levels that may be used by a receiver system to arbitrarily or adaptively predict the next starting antenna, in accordance with an embodiment of the invention. Referring to FIG. 3, in this exemplary illustration the receiver system 100 may implement a majority polling scheme where N=7 and K=4 for the case when $K=(N+1)/2$. A possible adaptive scheme that may used before reaching the eighth frame is a $K_n$-out-of-n selection scheme, where n is the frame number and $K_n$ is arbitrarily or adaptively chosen. In this example, the receiver system 100 may have two antennas and the starting antenna may be arbitrarily chosen. In the second frame and third frames, the selection scheme may be a 1-out-of-1 scheme. In the fourth and fifth frames, a 2-out-of-3 selection scheme may be used. In the sixth and seventh frames, a 3-out-of-5 selection scheme may be used. By the eighth frame there may be sufficient previous frames to implement a K-out-of-N scheme where N=7 and K=4.

Figure 4:
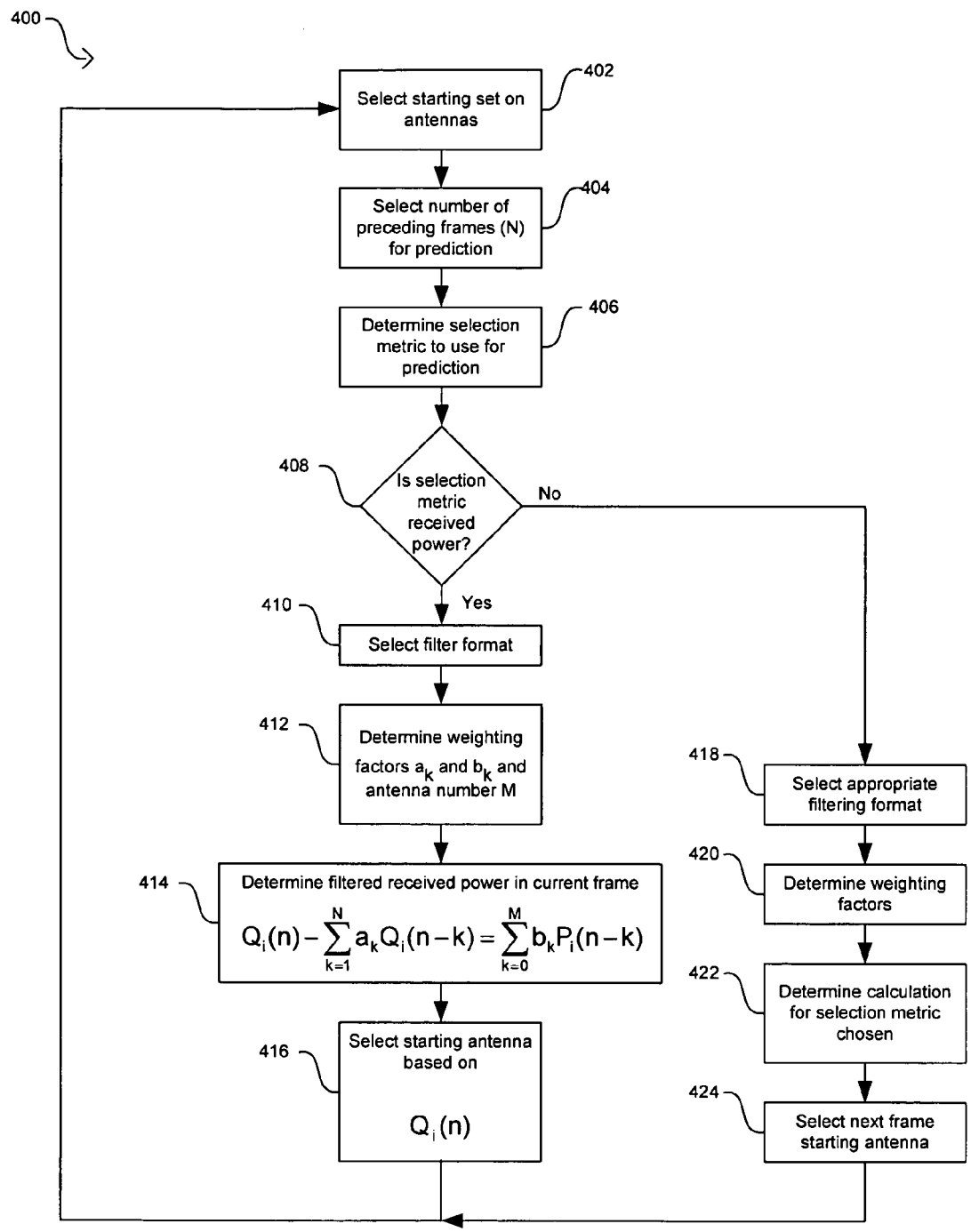
FIG. 4 is a flow diagram that illustrates exemplary steps that may be used by a receiver system to predict the next starting antenna based on a weighted sum scheme, in accordance with an embodiment of the invention.

FIG. 4 is a flow diagram that illustrates exemplary steps that may be used by a receiver system to predict the next starting antenna based on a weighted sum scheme, in accordance with an embodiment of the invention. Referring to FIG. 4, the flow chart 400 in step 402 may determine a set of starting antennas. If more than one receive path exists the processor 106 may select more than one starting antenna in step 402. In step 404 the processor 106 may select the number of frames N that may be used for prediction. The information on the preceding frames may have been collected by processor 106 and stored in memory 108. Once the number of frames for prediction is determined, the processor 106 may determine in step 406 which selection metric it may use in predicting the next starting antenna. The selection metrics may be, for example, the received power, the signal-to-noise ratio, and/or the packet error rate or bit error rate. In step 408, the processor 106 may determine whether the selection metric is the received power or a different selection metric. In step 408, the processor may also be configured to select more than one selection metric for antenna selection. If one of the selected selection metrics is a selection metric other than the received power, then the processor 106 may proceed to step 418. In step 418, the processor 106 may select an appropriate filtering format that may be used to determine the best overall antenna over the previous N frames based on the selection metric chosen. In step 420, the processor 106 may determine the appropriate weighting factors for that filtering format chosen in step 418. In step 422, the processor 106 may determine the filtered value for the selection metric chosen and in step 424 the processor 106 may select the next starting antenna based on the results from the filtering in step 422. Filtering may be applied to any selection metric.

If the selection metric chosen in step 408 was the received power, the processor 106 may select a received power filtering format that may be used for determining the next starting antenna. For example, when the selection metrics used may correspond to the estimated and the received power, a sample filtering format that may be used is a first-order infinite impulse response (IIR) filter $Q_i(n)=P_i(n)+a_1Q_i(n-1)$, where $P_i(n)$ represent the power estimate of antenna i for frame n and $Q_i(n)$ is the filtered version of $P_i(n)$. Another filtering format that may be used is a 3-tap moving average or finite impulse response (FIR) filter $$Q_i(n) = \sum_{k=0}^{2} \frac{1}{3} P_i(n-k).$$

A general expression of a filtering format may be $$Q_i(n) - \sum_{k=1}^{N} a_k Q_i(n-k) = \sum_{k=0}^{M} b_k P_i(n-k),$$

where the weighting factors $a_k$, $b_k$, N, and M may be chosen to provide the desired filtering.

In step 412, the processor 106 may chose the he weighting factors $a_k$, $b_k$, N, and M based on the filtering format selected in step 410. In step 412, the processor 106 may determine the filtered received power based on the filtering format and the number of preceding frames being used for prediction. In step 416, the processor 106 may select the next starting antenna or a group of possible next starting antennas based on the antenna with the maximum $Q_i(n)$.

To boost the performance and robustness of the selection diversity scheme, the starting antenna may be the antenna that may most likely be chosen for processing. In a stationary environment, the starting antenna for the current frame may often be correctly predicted by using collected information from previous frames. This collected information may be either the selection metrics such as power estimates of all antennas or they may be which antennas were chosen for reception over the last N frames.

Figure 5:
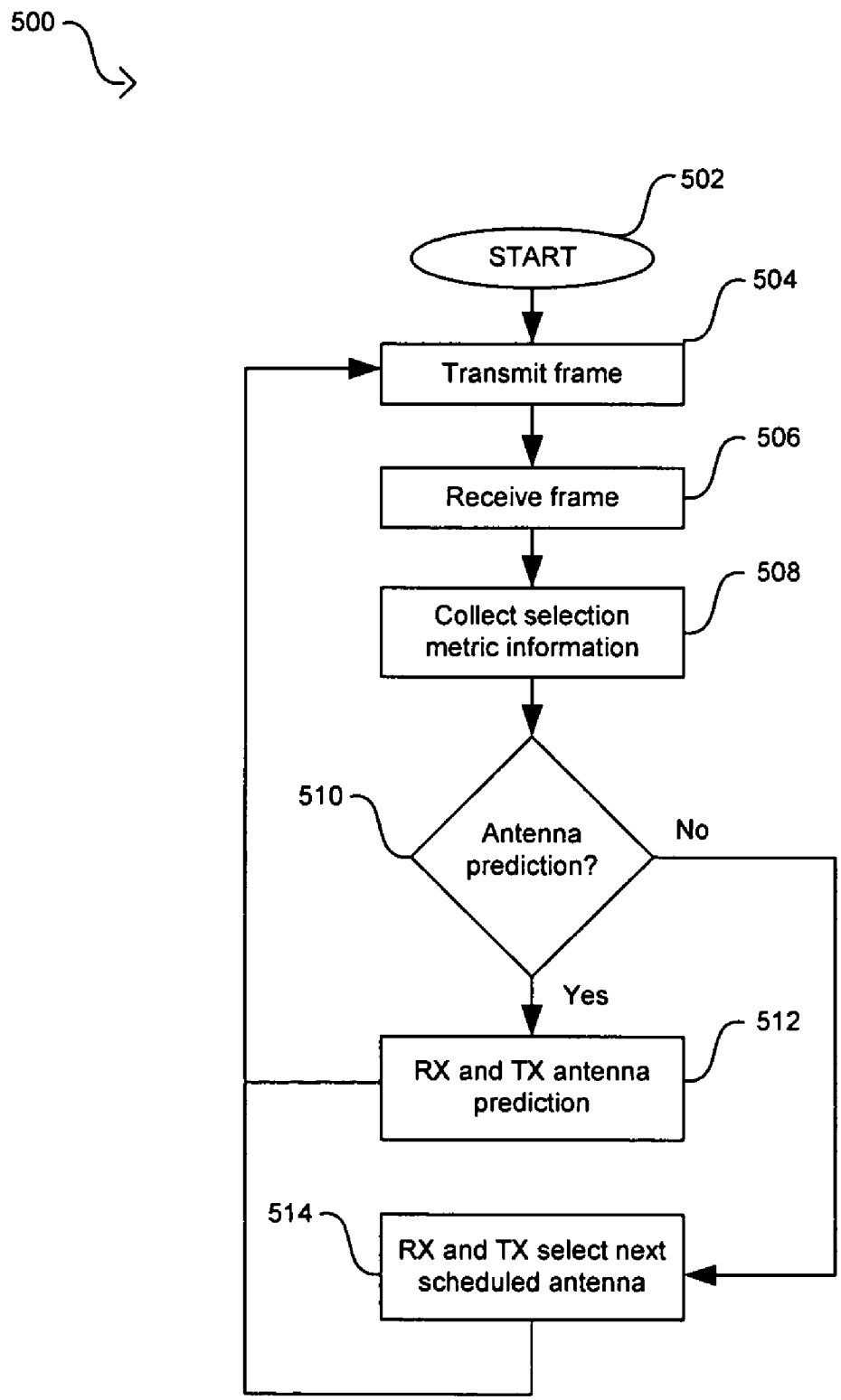
FIG. 5 is a flow diagram that illustrates exemplary steps that may be used by a receiver system to predict the next transmission antenna, in accordance with an embodiment of the invention.

FIG. 5 is a flow diagram that illustrates exemplary steps that may be used by a receiver system to predict the next transmission antenna, in accordance with an embodiment of the invention. Referring to FIG. 5, in flow diagram 500 after start step 502, the TX system 120 may be used in step 504 to transmit a frame of information to the RX system 110. The TX system 120 may have a schedule where it sends consecutive frames of information from different TX antennas 112 in a predetermined manner. In step 506, the RX system 110 receives the signal and may perform antenna selection diversity to determine the antenna 102 or group of antennas 102 that it may use for signal detection. In step 508, the RX system 110 may collect information on the selection metrics of antennas 102 and the TX antenna 112 that may be the source of the transmitted frame. The collected information may correspond to a specified number of frames and may be stored in memory 108.

In step 510, the RX system 110 may use the collected information to determine whether antenna selection diversity may be used in either the TX system 120 and/or the RX system 110. If antenna selection diversity may be used, the RX system 110 may predict in step 512 which antenna 102 or group of antennas 102 to use for frame detection in the next transmitted frame. The antenna selection diversity may be based on selection metrics, for example, an estimated received power, a received power, a signal-to-noise ration, a bit error rate, a packet error rate, a propagation channel characteristic, an/or a channel interference. The RX system 110 may also use selection diversity to predict which TX antenna 112 or group of TX antennas 112 to use for frame transmission because their reception is stronger than that of other TX antennas 112. The RX system 110 may recommend the TX system 120 as to the best TX antenna 112 or group of TX antennas 112 to use for transmission of the next frame. The RX system 110 may transfer the collected information or a portion of the collected information to the TX system 120 in order for it to determine which TX antenna or group of TX antennas 112 to use for transmission of the next frame. If antenna selection diversity may not be used in step 510, then the RX system 110 and the TX system 120 may select in step 514 their next scheduled starting receive and transmit antennas respectively. After steps 512 and 514 the TX system 120 prepares a new frame for transmission from either a predicted TX antenna 112 or from the next scheduled TX antenna 112 respectively.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling an antenna system, the method comprising:

collecting information associated with a plurality of frames received by a portion of a plurality of antennas;

selecting a receiving antenna from said portion of said plurality of antennas for each one of said received plurality of frames;

determining a selection index value for each one of said portion of said plurality of antennas, wherein each of said selection index values indicates a number of instances that a corresponding one of said each one of said portion of said plurality of antennas is selected as said receiving antenna over a determined number of said received plurality of frames; and selecting one or more candidate starting antennas by comparing each of said plurality of selection index values to a majority polling threshold value.

2. The method according to claim 1, comprising increasing said majority polling threshold value until a single candidate starting antenna is selected by said comparing.

3. The method according to claim 1, comprising decreasing said majority polling threshold value until a single candidate starting antenna is selected by said comparing.

4. The method according to claim 1, comprising selecting one starting antenna from said one or more candidate starting antennas.

5. The method according to claim 4, comprising dwelling on said selected one starting antenna to detect a received signal.

6. The method according to claim 5, comprising determining an estimated power level for said received signal during said dwelling on said selected one starting antenna.

7. The method according to claim 5, comprising determining a gain level by performing automatic gain control during said dwelling on said selected one starting antenna.

8. The method according to claim 5, comprising dwelling on a subsequent antenna selected from among a remaining portion of said portion of said plurality of antennas when a time duration for said dwelling on said subsequent antenna is insufficient to enable performing automatic gain control.

9. The method according to claim 8, comprising determining an estimated power level for signals received during said time duration based on a determined gain level.

10. The method according to claim 9, comprising storing each said determined estimated power level that is measured at each selected one of said portion of said plurality of antennas.

11. The method according to claim 10, comprising selecting one of said portion of said plurality of antennas to receive a remaining portion of a current frame based on said stored plurality of determined estimated power levels.

12. A computer readable medium having stored thereon, a computer program having at least one code section for controlling an antenna system, the at least one code section being executable by a computer for causing the computer to perform steps comprising:

collecting information associated with plurality of frames received by a portion of a plurality of antennas;

selecting a receiving antenna from said portion of said plurality of antennas for each one of said received plurality of frames;

determining a selection index value for each one of said portion of said plurality of antennas, wherein each of said selection index values indicates a number of instances that a corresponding one of said each one of said portion of said plurality of antennas is selected as said receiving antenna over a determined number of said received plurality of frames; and selecting one or more candidate starting antennas by comparing each of said plurality of selection index values to a majority polling threshold value.

13. The computer readable medium according to claim 12, wherein said at least one code section comprises code for increasing said majority polling threshold value until a single candidate starting antenna is selected by said comparing.

14. The computer readable medium according to claim 12, wherein said at least one code section comprises code for decreasing said majority polling threshold value until a single candidate starting antenna is selected by said comparing.

15. The computer readable medium according to claim 12, wherein said at least one code section comprises code for selecting one starting antenna from said one or more candidate starting antennas.

16. The computer readable medium according to claim 15, wherein said at least one code section comprises code for dwelling on said selected one starting antenna to detect a received signal.

17. The computer readable medium according to claim 16, wherein said at least one code section comprises code for determining an estimated power level for said received signal during said dwelling on said selected one starting antenna.

18. The computer readable medium according to claim 16, wherein said at least one code section comprises code for determining a gain level by performing automatic gain control during said dwelling on said selected one starting antenna.

19. The computer readable medium according to claim 16, wherein said at least one code section comprises code for dwelling on a subsequent antenna selected from among a remaining portion of said portion of said plurality of antennas when a time duration for said dwelling on said subsequent antenna is insufficient to enable performing automatic gain control.

20. The computer readable medium according to claim 19, wherein said at least one code section comprises code for determining an estimated power level for signals received during said time duration based on a determined gain level.

21. The computer readable medium according to claim 20, wherein said at least one code section comprises code for storing each said determined estimated power level that is measured at each selected one of said portion of said plurality of antennas.

22. The computer readable medium according to claim 21, wherein said at least one code section comprises code for selecting one of said portion of said plurality of antennas to receive a remaining portion of a current frame based on said stored plurality of determined estimated power levels.

23. A system for controlling an antenna system, the system comprising:

at least one processor that enables collection of information associated with a plurality of frames received by a portion of a plurality of antennas;

said at least one processor is operable to select a receiving antenna from said portion of said plurality of antennas for each one of said received plurality of frames;

said at least one processor is operable to determine a selection index value for each one of said portion of said plurality of antennas, wherein each said selection index values indicates a number of instances that a corresponding one of said each one of said portion of said plurality of antennas is selected as said receiving antenna over a determined number of said received plurality of frames; and said at least one processor is operable to select one or more candidate starting antennas by comparing each of said plurality of selection index values to a majority polling threshold value.

24. The system according to claim 23, wherein said at least one processor is operable to increase said majority polling threshold value until a single candidate starting antenna is selected by said comparing.

25. The system according to claim 23, wherein said at least one processor is operable to decrease said majority polling threshold value until a single candidate starting antenna is selected by said comparing.

26. The system according to claim 23, wherein said at least one processor is operable to select one starting antenna from said one or more candidate starting antennas.

27. The system according to claim 26, wherein said at least one processor is operable to dwell on said selected one starting antenna to detect a received signal.

28. The system according to claim 27, wherein said at least one processor is operable to determine an estimated power level for said received signal during said dwelling on said selected one starting antenna.

29. The system according to claim 27, wherein said at least one processor is operable to determine a gain level by performing automatic gain control during said dwelling on said selected one starting antenna.

30. The system according to claim 27, wherein said at least one processor is operable to dwell on a subsequent antenna selected from among a remaining portion of said portion of said plurality of antennas when a time duration for said dwelling on said subsequent antenna is insufficient to enable performing automatic gain control.

31. The system according to claim 30, wherein said at least one processor is operable to determine an estimated power level for signals received during said time duration based on a determined gain level.

32. The system according to claim 31, wherein said at least one processor is operable to store each said determined estimated power level that is measured at each selected one of said portion of said plurality of antennas.

33. The system according to claim 32, wherein said at least one processor is operable to select one of said portion of said plurality of antennas to receive a remaining portion of a current frame based on said stored plurality of determined estimated power levels.

* * * * *